United States Patent [19]

Brax

[11] Patent Number: 5,450,472
[45] Date of Patent: Sep. 12, 1995

[54] METHOD FOR HANDLING OF A CALL COMING TO TERMINAL EQUIPMENT IN A DIGITAL TRANSMISSION SYSTEM, AND A MOBILE TELEPHONE

[75] Inventor: Veikko Brax, Espoo, Finland
[73] Assignee: Nokia Telecommunications Oy, Espoo, Finland
[21] Appl. No.: 328,136
[22] Filed: Oct. 24, 1994

Related U.S. Application Data

[63] Continuation of Ser. No. 971,777, filed as PCT/FI95/00177, Jun. 5, 1992, abandoned.

[30] Foreign Application Priority Data

Jun. 17, 1991 [FI] Finland .................................. 912937

[51] Int. Cl.6 ........................ H04Q 7/20; H04M 11/00
[52] U.S. Cl. ..................................... 379/58; 379/100
[58] Field of Search ................ 379/100, 58, 93, 97; 358/442, 468, 434; 370/110.1; 455/345

[56] References Cited

U.S. PATENT DOCUMENTS

| | | | |
|---|---|---|---|
| 4,868,865 | 9/1989 | Ogawa et al. | 379/100 |
| 4,881,129 | 11/1989 | Mitsuhashi | 379/100 |
| 4,908,851 | 3/1990 | Kotani et al. | 379/100 |
| 4,914,716 | 4/1990 | Takahashi | 455/345 |
| 5,022,071 | 6/1991 | Mozer et al. | 379/100 |
| 5,050,005 | 9/1991 | Kagami | 370/110.1 |
| 5,073,921 | 12/1991 | Nomura et al. | 379/100 |
| 5,131,026 | 7/1992 | Park | 379/100 |
| 5,293,575 | 3/1994 | Hirai | 379/100 |

OTHER PUBLICATIONS

Jain, V. K., "Performance of a terminal adapter: CCITT v.110", Globecom '88, IEEE Global Telecommunications Conference and Exhibition—Communications for the Information Age Conference Record (IEEE Cat. No. 88CH2535-3) pp. 790-793 vol. 2, 1988.

Primary Examiner—Curtis Kuntz
Assistant Examiner—Michael B. Chernoff
Attorney, Agent, or Firm—Cushman Darby & Cushman

[57] ABSTRACT

A method for handling a call coming via a digital transmission system in terminal equipment suitable for speech and data service, the transmission system including at least one connection element which is a speech transmission connection when the call is in speech service mode and which is a data transmission connection rate-adapted in compliance with the CCITT recommendation V.110 or in a like manner and preferably attached to V.24 interfaces when the call is in data service mode. The terminal equipment starts the connection in speech service mode and automatically changes over to data service mode and initiates a procedure for changing the at least one connection element to a data transmission connection upon receipt, in speech mode, of a predetermined audio signal from the connection. The method can make use of a mobile telephone.

12 Claims, 2 Drawing Sheets

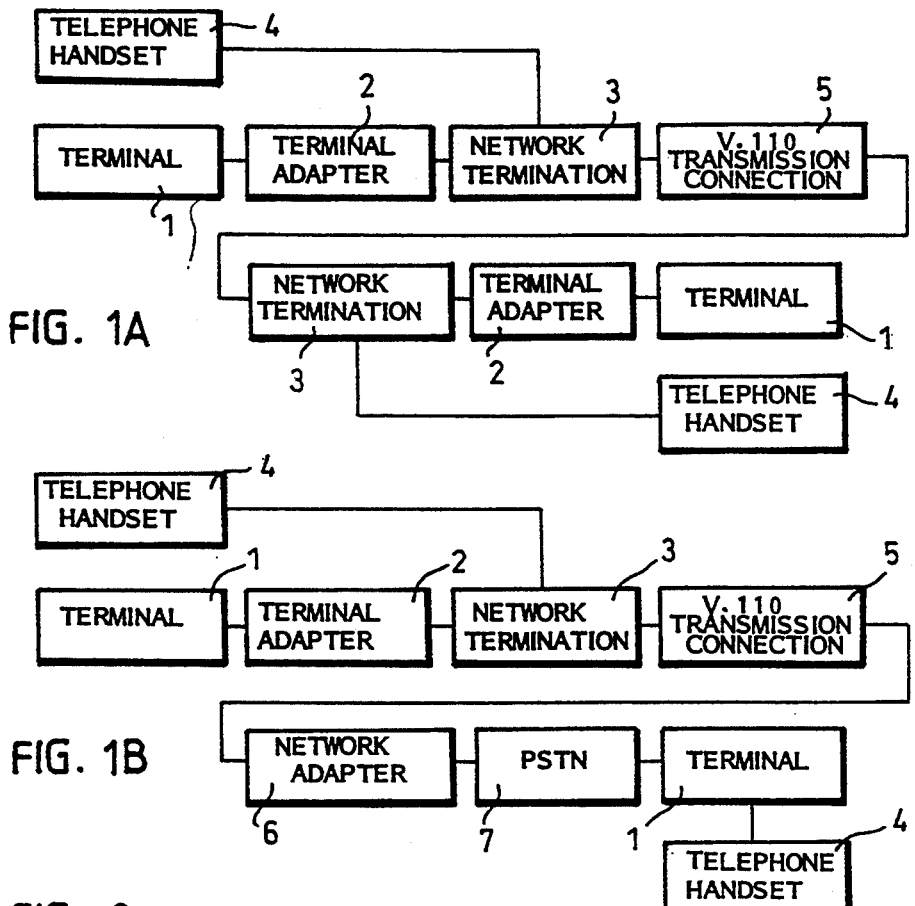
FIG. 1A
FIG. 1B
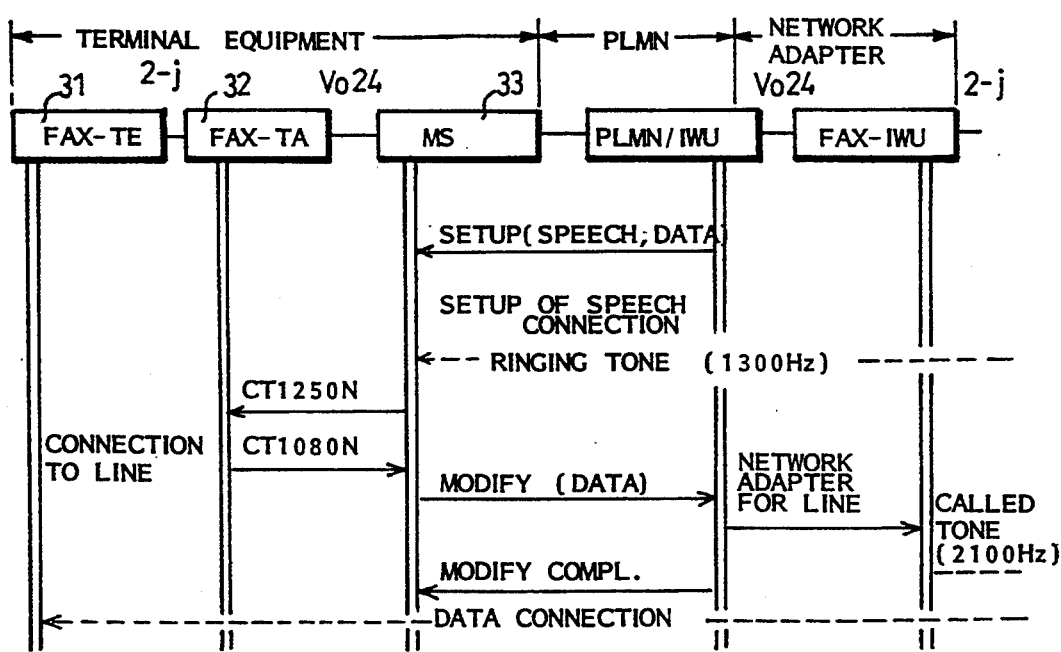
FIG. 2

METHOD FOR HANDLING OF A CALL COMING TO TERMINAL EQUIPMENT IN A DIGITAL TRANSMISSION SYSTEM, AND A MOBILE TELEPHONE

This is a continuation of U.S. application No. 07/971,777, filed as PCT/FI92/00177, Jun. 5, 1992, which was abandoned.

BACKGROUND OF THE INVENTION

The invention relates to a method for handling a call coming to terminal equipment suitable for speech and data service particularly in a digital transmission system, the transmission system comprising at least one connection element which is a speech transmission connection when the call is in speech service mode and which is a data transmission connection rate-adapted in compliance with the CCITT recommendation V.110 or in a like manner and preferably attached to V.24 interfaces when the call is in data transmission mode.

As used herein, "GSM" refers to Global System for Mobile Communications, a European digital mobile radio system, and "PLMN" refers to Public Land-Mobile Network.

In a GSM PLMN mobile telephone network, for instance, the radio connection between the mobile telephone and the fixed network will in data transmission be a V.110 rate-adapted UDI-coded digital connection attached to V.24 interfaces, and in speech transmission a PCM-coded digital connection. ISDN and GSM PLMN subscriber signalling will include an In-Call Modification procedure, by which the speech connection can, if required, be changed to a V.110 rate-adapted data connection and vice versa, an unlimited number of times. In a system of this kind, the terminal equipment may comprise, for instance, a telephone handset connected to a network termination (mobile telephone) or integrated in a data terminal for telephonic conversations and a data terminal adapted for a V.110 rate-adapted full-duplex connection by a terminal adapter.

Such terminal equipment suitable for both data and speech service include the Telefax Group 3 terminal equipment and personal computer telecommunications software which is adapted by means of a terminal adapter of a mobile telephone for instance to V.110 rate-adapted GSM PLMN radio connection.

The terminal devices of the Telefax Group 3 heretofore have not comprised a V.24 interface, but they have always utilized a modem interface and a 2-wire line (modem connection through a telephone network, for instance). As the same transmission line has in that case been able to transmit both modem signalling and speech, the terminal devices have been able to perform the transition from data service to speech service, for instance, in compliance with the service management protocol of the OSI layers 4 to 7 (for example CCITT T.30 or T.4) used in each case, without any need for the intermediate transmission network to have knowledge of the change of service mode or to react to such a change by altering the configuration of the transmission connection in any way. The service to be utilized has been manually selected from the terminal equipment. An incoming call to the terminal equipment has been started directly from this selected service.

In the GSM PLM, the control of an incoming call to terminal equipment has been so arranged that a mobile telephone whereto a data terminal is also attached selects speech or data service for the call by one of the following means:

1) The system has one catalogue number for each mobile telephone, the GSM PLMN connection being set up on the basis of the Bearer Capability (BC) information conveyed by the SETUP message sent. The BC specifies which service the connection is set up for.

2) The system has one catalogue number for each service of a mobile telephone, the GSMN PLMN connection being set up on the basis of the catalogue number of the service.

The first of the above-stated call control modes functions faultlessly if the GSM system is connected to the public switched telephone network (PSTN) wherein ISDN signalling ISUP (CCITT recommendations Q.721–Q.725) capable of transmitting a BC is employed. However, during the initial years GSM mobile telephone networks will have to be connected to the PSTN for instance by means of interexchange common channel signalling TUP (CCITT recommendations Q.761–Q.765) which is not at all capable of transmitting a BC, in which case the latter call control mode should be employed. In certain countries, however, the numbering plans for telephone networks may be so restricted that also in this case the GSMN PLMN can only be numbered by assigning one catalogue number to each mobile telephone. In such a case, the problem resides in how terminal equipment suitable for speech and data service can respond to an incoming call with the correct service.

SUMMARY OF THE INVENTION

It is the object of the invention to remove this problem.

This is achieved with the method of the invention for handling a call coming via a digital transmission system in terminal equipment capable of speech and data service, when the transmission system comprises at least one connection element which is a normal speech transmission connection when the call is in speech service mode and which is a data transmission connection rate-adapted in compliance with the CCITT recommendation V.110 or in a like manner and attached to V.24 interfaces when the call is in data service mode. In the method, the terminal equipment starts the connection in speech service mode and automatically changes over to data service mode and initiates a procedure for changing said at least one connection element to a data transmission connection upon receipt, in speech mode, of a predetermined audio signal from the connection.

The invention also relates to a method for handling an incoming call to terminal equipment suitable for speech and data service in a digital transmission system, the method being characterized in that the incoming call is set up in such a way that said at least one connection element is in speech transmission mode, and that said at least one connection element is changed from speech transmission mode to data transmission mode by a procedure started by the terminal equipment upon receipt of a predetermined audio signal from the connection element during the speech service.

The invention also relates to a mobile telephone for a digital mobile telephone system, in which system the radio connection between the mobile telephone and the fixed transmission network is a normal speech connection when the mobile telephone is in speech mode, and a data transmission connection rate-adapted in compliance with the CCITT recommendation V.110 or in a like manner when the mobile telephone is in data mode, the mobile telephone comprising a radio unit including a transceiver and channel coder means; a telephone set; a terminal adapter adapting a V.24 or similar interface for said radio connection when the mobile telephone is in data mode; and change-over means wherewith the radio unit can be connected either to the telephone set or to the terminal adapter. The mobile telephone is characterized in that it further comprises control means for controlling the change-over means to automatically connect the radio unit to the terminal adapter in response to reception of a predetermined audio signal from the speech connection when the radio unit is connected to the telephone set.

In the invention, both the transmission system and the terminal equipment start the connection with speech service in the case of an incoming call. If also the calling subscriber is in speech service (telephone), the call is continued in the normal way. If, on the other hand, the calling subscriber is a data terminal calling from the PSTN and using a modem, for instance, its modem transmits a standard ringing tone or an equivalent audio signal. In the invention, the terminal equipment includes recognition of such a tone, resulting in initiation of the change of the terminal equipment and the transmission connection to data service. With the invention, the terminal equipment can automatically respond to an incoming call with the correct service without any non-standard supplementary functions being required in the transmission system.

BRIEF DESCRIPTION OF THE DRAWINGS

The invention will now be described in more detail by means of exemplifying embodiments with reference to the attached drawings, in which:

FIGS. 1A and 1B show systems according to the invention, in which terminal devices are interconnected through a V.110 connection only, and through a V.110 connection and a transit network respectively, FIG. 2 is a signalling diagram illustrating the setup of an incoming call in accordance with the invention and the change of service mode in the case of a V.110 connection employed in a GSM PLMN system (digital mobile telephone system)

DETAILED DESCRIPTION

Figure 3:
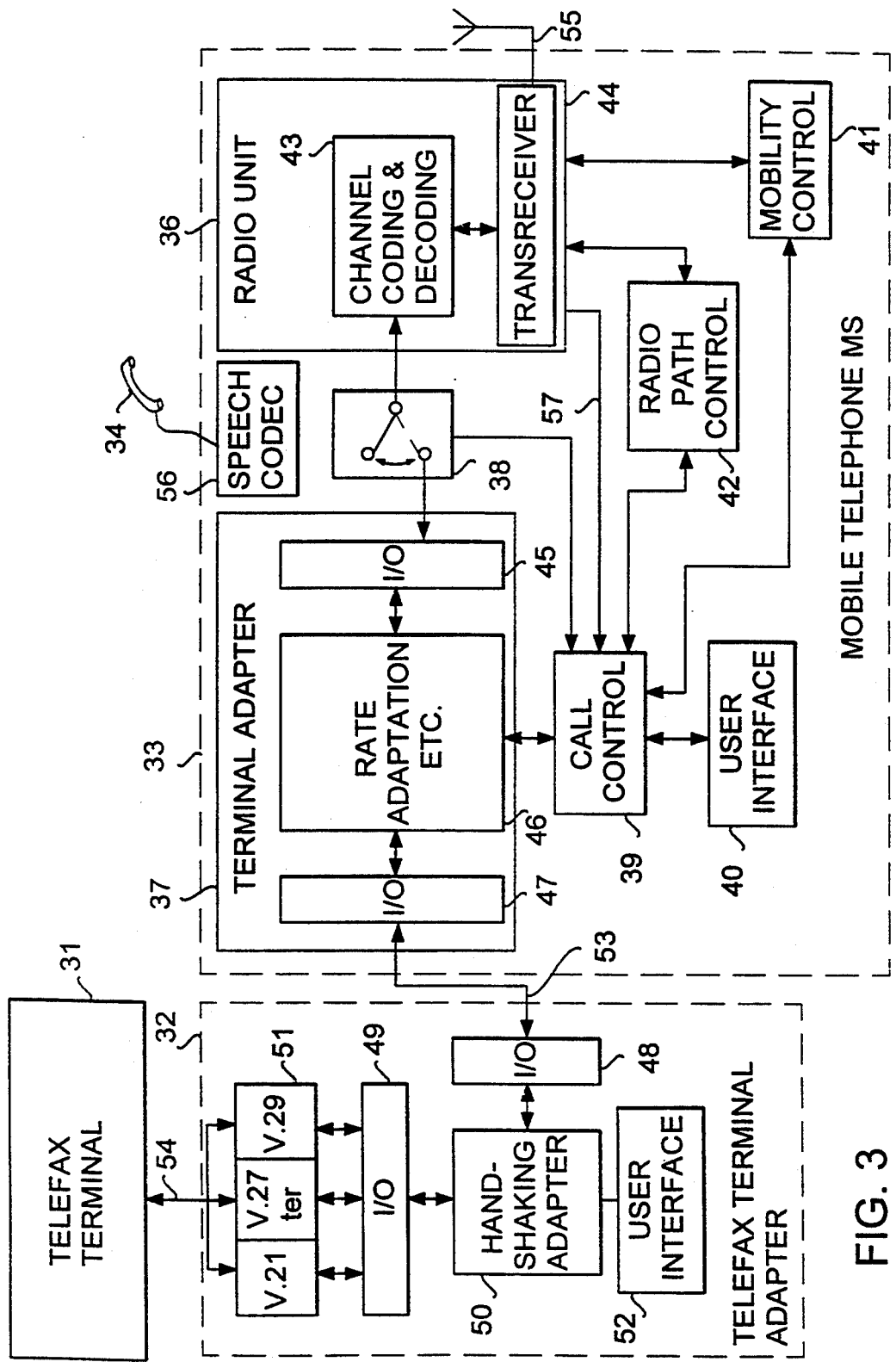
FIG. 3 is a block diagram illustrating a mobile telephone in accordance with the invention.

As shown for example in FIGS. 1A and 1B, the terminal equipment of the system according to the invention may comprise a telephone handset 4 connected to a network termination 3 or integrated in a data terminal 1 for telephonic conversations, and a data terminal 1 adapted for a V.110 rate-adapted full-duplex connection by a terminal adapter 2. The V.110 connection described in this context is a digital transmission channel initially developed for ISDN (Integrated Services Data Network) technology, and it can be attached to a V.24 interface and offers a possibility of transferring V.24 states (control signals). The invention can, however, also be applied to other transmission channels which are similar to the V.110 connection and capable of transferring V.24 states. An example of such transmission channels is the CCITT recommendation V.120, which is being developed.

The CCITT recommendation for a V.110 rate-adapted connection is set forth in the publication CCITT Blue Book: V.110.

The CCITT recommendation for a V.24 interface is set forth in the publication CCITT Blue Book: V.24. In the description hereinbelow, V.24 states refer to control signals in the V.24 interface, such as CT105, CT106, CT107, CT108.2 and CT109.

As shown in FIG. 1B, the terminal equipment may be interconnected solely through a V.110 rate-adapted network, i.e. for instance ISDN or GSM PLMN.

Alternatively, as shown in FIG. 1A, the terminal equipment may be interconnected through a transit network 7 (PSTN) in addition to the V.110 connection, in which case a network adapter 6 is provided between the V.110 connection and the transit network. There are several possibilities for transit networks, e.g.:
— from GSM PLMN through PSTN to GSM PLMN with a modem as the network adapter 6,
— from GSM PLMN to the terminal equipment of PSTN with a modem as the network adapter,
— from ISDN through PSTN to ISDN with a modem as the network adapter 6,
— from ISDN to terminal equipment of PSTN with a modem as the network adapter 6,
— from GSM PLMN through ISDN to GSM PLMN with mere synchronization and user data rate adapting as the network adapter 6.

Terminal equipment suitable for both data and speech service mode include the Telefax Group 3 terminal device or the personal computer telecommunication software, which is adapted by a terminal adapter for instance for an ISDN V.110 rate-adapted 64 kbit/s UDI bearer service or a GSM PLMN 9.6/4.8/2.4 kbit/s UDI bearer service. The terminal device may be full-duplex or half-duplex, and it comprises a standard or non-standard terminal session protocol corresponding to the OSI layers 4 to 7 for the management and use of speech-/data services. The network termination is thus e.g. NT in ISDN or MT2 in GSM PLMN. Examples of such service procedures corresponding to the OSI layers 4 to 7 are the CCITT recommendations T.4 and T.30, which are found in the publications CCITT Blue Book: T.4 and CCITT Blue Book: T.30.

In the following, the invention will be described by means of an exemplary system in which the handshaking of the Telefax Group 3 terminal devices in compliance with the CCITT recommendation T.30 is adapted to GSM PLMN, using PSTN as a transit network 7 as well as a modem-based network adapter 6.

As illustrated in FIGS. 2 and 3, the subsystems of the GSM PLMN telecopier service comprise mobile terminal equipment 31, 32 and 33 and a network adapter 6 for the public switched telephone network (PSTN), as shown by FIG. 2. The network adapter for PSTN comprises a transmission rate adapter (RA) and a telefax network adapter (Fax-IWU). Fax-IWU is half-duplex in the direction towards the 2-wire connection of the PLMN, but full-duplex towards the GSM PLMN.

The mobile unit is constituted by a telefax terminal (Fax-TE) 31, a telefax terminal adapter (Fax-TA) 32, and a mobile telephone (radiotelephone) (MS) 33.

The telefax terminal adapter 32 is an adapter complying with GSM 03.45, being half-duplex towards the 2-wire connection 54, but full-duplex towards the mobile telephone 33. The telefax terminal adapter 32 comprises a handshaking adapter 50, attached to a V.24 interface 53 of the terminal adapter 37 by means of an I/O circuit 48 and to a modem unit 51 by means of another I/O circuit 49. The modem unit 51 comprises three different modems, one for each of the standards V.21, V.27ter and V.29. Each modem is connected to the same 2-wire line 54 to which the modem of the telefax terminal 31 is also connected, so that there is a modem connection between the adapter 32 and the terminal 31. The telefax terminal adapter selects for each connection one of the three modems as a result of the handshake with the telefax terminal 31. The telefax terminal 31 is a standard PSTN terminal device.

The mobile telephone 33 comprises a radio unit 36, call control 39, a user interface 40 (for instance a keyboard and display), mobility control 41 for the mobile telephone, radio path control (signalling functions) 42, and a terminal adapter 37 providing a V.24 interface. The call control of the transparent telecopier services of GSM PLMN is specified in the GSM recommendation 03.45.

The radio unit 36 comprises for instance a radio transceiver 44 connected to an antenna 55, and a channel coder and decoder unit 43. The unit 43 can be connected by means of a change-over unit 38 either to the telephone set, which comprises for example a speech codec 56 and a handset 34, or to a terminal adapter.

The terminal adapter 37 comprises a unit 46 performing the rate adaptation of the V.24 connection for a CCITT V.110 rate-adapted data transmission connection. The unit 46 is attached to the change-over switch 38 by means of an I/O circuit 45 and to the telefax adapter 32 by means of an I/O circuit 47 constituting a V.24 interface 53.

The mobile telephone service mode (speech or data) is selected with the call control 39 controlling the change-over switch 38. In current mobile telephones, the call control 39 selects the service mode either on the basis of the Bearer Capacity data sent along with the SETUP message or on the basis of a command given by the user through the user interface 40.

In accordance with the invention, the mobile telephone is also provided with detector means monitoring the audio signal received from the speech connection when the mobile telephone is in speech mode towards the telephone set. Upon detecting that the received signal is a call signal sent by a modem (typically a 1300 Hz sine-wave signal), for instance, these detector means generate a control signal 57. The call control 39 reacts to the control signal 57 by directing the change-over switch 38 to change its mode, as a result of which the telephone set is disconnected from the radio unit 36 and the terminal adapter 37 is connected to the radio unit 36. The detector means may be located for instance in the channel decoder unit 43 of the radio unit. Alternatively, the detector means may also be located in the speech signal processing stages, for example in the speech codec 56. The detector means can be realized in many ways obvious as such to one skilled in the art, such as a frequency detector circuit.

The signalling diagram of FIG. 2 illustrates the switching of a call from a public switched telephone network to the mobile telephone 33. The GSMN PLMN network establishes the connection, starting with speech service and a speech connection, transmitting to the terminal equipment or to the mobile telephone a SETUP message initially containing Bearer Capability data in the sequence speech and data, in which situation the mobile telephone is also in speech mode. If the calling subscriber in the public switched telephone network is a telephone, there is a conventional speech connection between the end users whereby PCM-coded speech is transmitted, and the change-over switch 38 maintains the radio unit 36 connected to the telephone set. If, however, the calling subscriber is a data terminal using a modem (for instance a telecopier), its modem sends a ringing tone in the audio range (for instance 1300 Hz) in the normal way in accordance with standard V.25bis. Since there is a speech connection between the calling subscriber and the mobile telephone 33, the ringing tone sent by the calling subscriber is transmitted to the mobile telephone 33, and the ringing tone detecting function included in the mobile telephone in accordance with the invention executes, upon receipt and recognition of the ringing tone, the connection of the radio unit 36 to the terminal adapter, upon which the mobile telephone 33 (terminal adapter 37) receives the ringing tone and in recognition of said ringing tone sets the V.24 signal CT125 to ON for the telefax terminal 31 through the modem connection established by the V.24 interface 53 and the telefax terminal adapter 32. The telefax terminal 31 is connected to the line in the conventional way for instance by means of a V.25bis command, in which situation it responds for instance by setting the V.24 signal CT108.2 to ON. Consequent upon this V.24 status, the terminal adapter 37 requests the call control 39 to initiate a standard In-Call Modification procedure changing the PLMN speech connection to a rate-adapted data connection in compliance with V.110. In connection with the setup of the data connection, the network adapter FAX-IWU is connected to the line, and its modem transmits a called tone (2100 Hz) to the calling subscriber. The special feature of the invention is that the ringing tone sent by the calling subscriber is recognized by the mobile telephone 33, even though the, modem used by the mobile telephone during data transmission is in the network adapter FAX-IWU.

The current Telecopier Group 3 devices are intended for connection to a 2-wire line through a modem. However, it is possible to provide the telefax terminal 31 with a V.24 interface in compliance with the GSM PLMN standard, through which the terminal device is directly attached to the terminal adapter 37 of the mobile telephone.

The drawings and the description pertaining thereto are only intended to illustrate the invention. In its details, the invention may vary within the scope of the accompanying claims. For example, the mobile telephone may alarm for each incoming call a few times first and only thereafter proceed to the function in accordance with the invention. Further, the mobile telephone may, when performing the function in accordance with the invention, transmit a previously stored oral message, so that the possible calling person will not be puzzled by the silent connection and hang up. This message may also be a message of an automatic telephone answering machine connected to the mobile telephone.

I claim:

1. A call control method comprising:
    setting up an incoming call to a mobile terminal equipment having a speech service mode and a data service mode in a digital transmission system of a mobile telephone and data network comprising at least one connection element for connecting by radio between the mobile terminal equipment and a fixed network, which connection element is a speech transmission connection for a mobile telephone part of said mobile terminal equipment when the call is in said speech service mode and which is a rate-adapted data transmission connection for a mobile data terminal part of said mobile terminal equipment and attached to a data interface when the call is in said data service mode;

initiating said call in a manner that both said mobile terminal equipment and said at least one connection element are in said speech service mode;

receiving a predetermined audio signal in said call at said mobile terminal equipment in said speech mode, and automatically both:

changing over said mobile terminal equipment to said data service mode in response to said receipt of said predetermined audio signal; and initiating a procedure for changing said at least one connection element from being said speech transmission connection to being said rate adapted data transmission connection in response to said receipt of said predetermined audio signal.

2. The method of claim 1, wherein:

said rate-adapted data transmission connection is rate-adapted in compliance with CCITT recommendation V.110 and said at least one connection element is attached in said rate-adapted data transmission connection to a V.24 interface.

3. The method of claim 1, wherein:

said predetermined audio signal is a modem ringing tone.

4. A mobile telephone for a digital mobile telephone system wherein at least one radio connection element between a mobile telephone and a fixed transmission network is in, a speech connection when the mobile telephone is in speech transmission mode, and in a rate-adapted data transmission connection when the mobile telephone is in data mode, said mobile telephone comprising:

a radio unit including a transceiver and channel coder means;

a telephone set for use when the mobile telephone is in said speech transmission mode;

a terminal adapter adapting a data interface for said radio connection when the mobile telephone is in data mode;

change-over means for connecting the radio unit to the telephone set or to the telephone adapter; and control means responsive to reception of a predetermined audio signal from the speech connection when the radio unit is connected to the telephone set, for controlling the change-over means to automatically connect the radio unit to the terminal adapter and for initiating a procedure for changing said at least one connection element in said digital mobile telephone system from said speech connection in said speech transmission mode to said rate-adapted data transmission connection in said data mode.

5. The mobile telephone of claim 4, wherein:

said control means comprise means located in said radio unit for recognition of said audio signal.

6. The mobile telephone of claim 5, wherein:

said telephone set has a channel codec and a speech codec and said means for recognition of the audio signal is included in one of said channel codec and speech codec.

7. The mobile telephone of claim 4, wherein:

said predetermined audio signal is a modem ringing tone.

8. The mobile telephone of claim 7, wherein:

said modem ringing tone has a frequency of 1300 Hz.

9. The mobile telephone of claim 7, wherein:

said control means comprise means located in said radio unit for recognition of said audio signal.

10. The mobile telephone of claim 9, wherein:

said telephone set has a channel codec and a speech codec and said means for recognition of the audio signal is included in one of said channel codec and speech codec.

11. The mobile telephone of claim 4, wherein:

said terminal adapter is connected via a data interface to a data terminal.

12. The mobile-telephone of claim 4, wherein:

said terminal adapter is connected via a data interface to a data terminal via a supplementary adapter which comprises at least one modem; and there being a modem connection between said supplementary adapter and said data terminal.

* * * * *

UNITED STATES PATENT AND TRADEMARK OFFICE
CERTIFICATE OF CORRECTION

PATENT NO.   : 5,450,472
DATED        : September 12, 1995
INVENTOR(S)  : BRAX, Veikko It is certified that error appears in the above-identified patent and that said Letters Patent is hereby corrected as shown below:

On the title page:

Item [63], change "PCT/FI95/00177" to --PCT/FI92/00177--.

Signed and Sealed this

Twenty-first Day of May, 1996

*Attest:*

BRUCE LEHMAN

*Attesting Officer*     *Commissioner of Patents and Trademarks*